US010688907B2

(12) United States Patent
Freeman et al.

(10) Patent No.: US 10,688,907 B2
(45) Date of Patent: Jun. 23, 2020

(54) AUTOMATED TRAILER PNEUMATIC INFLATION SYSTEM (71) Applicant: InTouch Shipping Technology, Ltd., Necedah, WI (US)

(72) Inventors: Davis Freeman, Sun Prairie, WI (US); Richard E. Futter, Jr., Mequon, WI (US)

(*) Notice: Subject to any disclaimer, the term of this patent is extended or adjusted under 35 U.S.C. 154(b) by 117 days.

(21) Appl. No.: 15/678,353

(22) Filed: Aug. 16, 2017

(65) Prior Publication Data
US 2020/0094728 A1 Mar. 26, 2020

(51) Int. Cl.
*B60P 7/06* (2006.01)
*F17C 13/04* (2006.01)

(52) U.S. Cl.
CPC .............. *B60P 7/065* (2013.01); *F17C 13/04* (2013.01); *F17C 2221/031* (2013.01);
(Continued)

(58) Field of Classification Search
CPC .. B60P 7/06; B60P 7/065; F17C 13/04; F17C 2270/0181; F17C 2250/03;
(Continued)

(56) References Cited

U.S. PATENT DOCUMENTS 2,674,206 A   4/1954   William
2,856,867 A   10/1958  Dasey
(Continued)

FOREIGN PATENT DOCUMENTS

AU   3956102 A   6/2002
CA   2428632     10/2010
(Continued)

OTHER PUBLICATIONS

International Search Report and Written Opinion of the International Searching Authority dated Nov. 29, 2018 for PCT/US2018/046796 filed Aug. 16, 2018, 8 pages.

*Primary Examiner* — Nicolas A Arnett
(74) *Attorney, Agent, or Firm* — Boardman & Clark LLP (57) ABSTRACT

An automatic multi-air bag pneumatic inflation system for a trailer is also disclosed. The inflation system includes a system control unit coupleable to an air supply for controlling the flow of pressurized air in the pneumatic inflation system. The system control unit comprises an inlet for coupling to the air supply with an on/off valve for providing a flow of air, a primary regulator in communication with the flow of air and the on/off valve, an inflation pressure tank in communication with the flow of air and the primary regulator, a control valve in communication with the inflation pressure tank and/or primary regulator, and used to control the air flow, a function selection valve for selecting between inflation and deflation, and an outlet. A plurality of fill stations are fluidly coupled to the system control unit. One or more fill stations of said plurality of fill stations are fluidly coupled to an air bag for inflation and deflation thereof. The fill stations may include a manifold block, including a first inlet/outlet for fluidly coupling to the system control unit for transmission of the air supply, a safety relief valve joined to the manifold in fluid communication with the air supply, a shut-off valve for manually opening and closing the fluid connection between the manifold and the air bag, and a hose in fluid communication with the manifold and the air bag for transfer of the air supply to the air bag. The plurality of air bags which are spaced about the trailer, and a plurality of fill stations are spaced throughout the trailer, and one or more of the valves in the system control unit and the fill station operate to maintain a predetermined pressure in the air bag(s).

20 Claims, 9 Drawing Sheets (52) U.S. Cl.
CPC .. *F17C 2227/047* (2013.01); *F17C 2250/032* (2013.01); *F17C 2250/0626* (2013.01); *F17C 2270/0181* (2013.01)

(58) Field of Classification Search
CPC ........ F17C 2250/032; F17C 2250/0626; F17C 2227/04; F17C 2227/047; F17C 2221/031
See application file for complete search history.

(56) References Cited

U.S. PATENT DOCUMENTS

| | | | |
|---|---|---|---|
| 2,960,942 A | 11/1960 | Pier et al. | |
| 2,990,070 A | 6/1961 | Cushman | |
| 3,067,699 A | 12/1962 | Fredriks | |
| 3,098,455 A * | 7/1963 | McElroy | B61D 45/008 |
| | | | 410/125 |
| 3,115,977 A | 12/1963 | Mirando | |
| 3,131,648 A | 5/1964 | Seger | |
| 3,160,118 A | 12/1964 | Newell | |
| 3,192,879 A * | 7/1965 | Pier | B61D 45/006 |
| | | | 410/124 |
| 3,199,689 A | 8/1965 | Feldkamp | |
| 3,462,027 A | 8/1969 | Puckhaber | |
| 3,603,535 A | 9/1971 | DePolo | |
| 3,715,099 A | 2/1973 | Shendure | |
| 3,753,414 A | 8/1973 | Enochian | |
| 3,762,590 A | 10/1973 | Grooss | |
| 3,827,635 A | 8/1974 | Krakowski et al. | |
| 3,847,091 A | 11/1974 | Holt | |
| 3,915,096 A | 10/1975 | Salisbury | |
| 4,044,693 A | 8/1977 | Ramsey, Jr. | |
| 4,146,069 A | 3/1979 | Angarola et al. | |
| 4,146,070 A | 3/1979 | Angarola et al. | |
| 4,546,956 A | 10/1985 | Moberg | |
| 4,678,014 A | 7/1987 | Owen et al. | |
| 4,765,569 A | 8/1988 | Higgins | |
| 5,056,558 A * | 10/1991 | Rodgers | B61D 45/008 |
| | | | 137/552 |
| 5,159,961 A | 11/1992 | Snetting et al. | |
| 5,466,104 A | 11/1995 | Gatwood | |
| 5,566,728 A | 10/1996 | Lange | |
| 5,660,512 A | 8/1997 | Elze et al. | |
| 5,806,572 A | 9/1998 | Voller | |
| 5,829,492 A | 11/1998 | Gavronsky et al. | |
| 5,833,413 A | 11/1998 | Cornelius | |
| 5,839,488 A | 11/1998 | Peters | |
| D423,322 S | 4/2000 | Stover | |
| 6,457,921 B1 | 10/2002 | Freeman | |
| 6,746,190 B2 | 6/2004 | Freeman | |
| 7,226,258 B2 | 6/2007 | Roloff | |
| 7,285,735 B1 | 10/2007 | Elliott et al. | |
| 7,377,393 B2 | 5/2008 | Maresh et al. | |
| 7,677,267 B2 * | 3/2010 | Warnick | F15B 11/028 |
| | | | 137/492.5 |
| 7,758,291 B2 | 7/2010 | Maresh et al. | |
| 8,348,563 B2 | 1/2013 | Buxton | |
| 8,701,697 B2 | 4/2014 | Radosevic | |
| 9,969,315 B2 * | 5/2018 | Beard | B60P 7/065 |
| 2012/0315105 A1 | 12/2012 | Freeman et al. | |
| 2015/0375670 A1 * | 12/2015 | Beard | B60P 7/065 |
| | | | 222/3 |

FOREIGN PATENT DOCUMENTS

| | | |
|---|---|---|
| JP | 2-98563 A | 4/1990 |
| WO | 2000/035718 A1 | 6/2000 |
| WO | 2002/042117 A1 | 5/2002 |

* cited by examiner

AUTOMATED TRAILER PNEUMATIC INFLATION SYSTEM

FIELD

This invention relates to a pneumatic inflation system for use with a freight carrier, such as a tractor-trailer, along with reusable air bags inflatable with the inflation system for bracing freight and cargo during transit, thereby preventing damage to the freight.

BACKGROUND

Transporting large freight over long distances is an integral part of virtually every industry. Trucks, railroad cars, airplanes, ships, etc., are all commonly used to transport goods. In general terms, however, a freight carrier, such as a tractor-trailer, temporarily stores the freight during transport. To this end, freight protection within the carrier has remained unchanged for many years. Damaged freight is considered a part of doing business. With specific reference to tractor-trailers, there are currently three methods used for protection of freight during transit.

One method used is load locks. Load locks protect the load from leaning or falling out of the end of the trailer. Load locks do not protect the entire load from damage. Load locks are cumbersome, difficult to maneuver, heavy and often fail during transit. Another method is the use of low grade, unreliable, one-time use, paper dunnage bags. These bags are used once and then cut up by the user at the destination, generating significant waste. Third, vinyl or plastic inflatable dunnage bags are also used in freight carriers where it is customary to fill the spaces between the cargo, or between the cargo and the walls of the freight carrier, to prevent the cargo from shifting and damaging either the cargo itself, and/or the walls of the freight carrier. These bags are inflated at the shipping dock. Typically, the freight protection is installed/provided when the freight is initially placed into the trailer. Trailer door is shut and the freight protection devices that were installed are expected to withstand the hazards of travel to the destination. Air bags often deflate during transit due to changes in pressure in and outside the trailer as the driver ascends and descends in the mountains. Air bags and other freight protection devices also fail and fall to the floor of the trailer over the rough roads and driver maneuvers. Unfortunately, once the tractor-trailer has left the dock, it is impossible to re-inflate the air bags, as a pressurized air source is no longer available.

A need also exists for an improved system to inflate multiple air bags in a trailer and to automatically maintain pressure of such air bags in a trailer.

SUMMARY

In accordance with one aspect of the present invention, a trailer pneumatic inflation system for use with a freight carrier, such as a tractor-trailer, is provided. The inflation system is available to inflate reusable air bags to cushion freight during shipment from one location to another. In one preferred embodiment, the inflation system includes an air control unit and an air coupler device. The air control unit is fluidly connectable to a compressed air storage reservoir of a tractor-trailer and supplies air to the air coupler device. In one preferred embodiment, the air control unit includes a brake protection valve and a control valve. The brake protection valve substantially disconnects the inflation system from the air storage reservoir in the event that the air pressure of the reservoir drops below a predetermined value, thereby preventing possible failure of the trailer's braking system. The control valve is available for a user to conveniently shut the inflation system off. In another preferred embodiment, the air control unit and the air coupler device are both mounted to the underside of a freight carrier defined by a front, a back, and opposing sides. The air control unit is positioned in close proximity to the carrier's air storage reservoir, whereas the air coupler device is positioned adjacent one of the sides.

In another preferred embodiment, the inflation system is available to inflate a plurality of inflatable bags useful for protecting freight stored within the freight carrier. The inflatable bags are preferably configured to be re-useable and each includes upper and lower latching tabs. These latching tabs are configured to receive a coupling device that secures the respective inflatable bag to the freight. With this configuration, the inflatable bag will not undesirably slide downwardly relative to the freight during transit.

In one or more examples of embodiments, a multi-air bag pneumatic inflation system is disclosed. The system includes a system control unit coupleable to an air supply for controlling the flow of pressurized air in the pneumatic inflation system, and a plurality of fill stations fluidly coupled to the system control unit. One or more fill stations of said plurality of fill stations is fluidly coupled to an air bag for inflation and deflation thereof.

An automatic multi-air bag pneumatic inflation system for a trailer is also disclosed. The inflation system includes a system control unit coupleable to an air supply for controlling the flow of pressurized air in the pneumatic inflation system. The system control unit comprises an inlet for coupling to the air supply with an on/off valve for providing a flow of air, a primary regulator in communication with the flow of air and the on/off valve, an inflation pressure tank in communication with the flow of air and the primary regulator, a control valve in communication with the inflation pressure tank and/or primary regulator, and used to control the air flow, a function selection valve for selecting between inflation and deflation, and an outlet. A plurality of fill stations are fluidly coupled to the system control unit. One or more fill stations of said plurality of fill stations are fluidly coupled to an air bag for inflation and deflation thereof. The fill stations may include a manifold block, including a first inlet/outlet for fluidly coupling to the system control unit for transmission of the air supply, a safety relief valve joined to the manifold in fluid communication with the air supply, a shut-off valve for manually opening and closing the fluid connection between the manifold and the air bag, and a hose in fluid communication with the manifold and the air bag for transfer of the air supply to the air bag. The plurality of air bags which are spaced about the trailer, and a plurality of fill stations are spaced throughout the trailer, and one or more of the valves in the system control unit and the fill station operate to maintain a predetermined pressure in the air bag(s).

Accordingly, several objects and advantages of the preferred embodiments of the present invention are, among others: (a) to provide ability for the driver to make adjustments in freight protection during transit from origin to destination; (b) to provide a trailer pneumatic inflation system in combination with inflatable air bags that can stabilize any type of cargo; (c) to provide a trailer pneumatic inflation system in combination with inflatable air bags that will reduce driver tension, minimizing concern about shifting of the cargo in any direction; (d) to provide a trailer pneumatic inflation system in combination with inflatable air bags that is easy and quick to install to stabilize cargo; (e) to provide a trailer pneumatic inflation system that works secondary to the air braking system; (0 to provide ability to inflate the air bags from the tractor-trailer; (g) to provide a fail safe inflation device that ensures protection of the tractor-trailer; (h) to provide on-board inflatability of air bags; (i) to provide use of the truck trailers compressed air source (air tank); (j) to provide continuous freight protection regardless of pressure and temperature changes within and outside the trailer, rough roads and hazardous travel using aligning and safety flaps on the air bags; (k) to provide freight protection to the entire load; (l) to provide an appropriate type of air bag suitable to protect the size of freight being hauled; (m) to provide for a reduction of waste in the transportation industry, providing a reusable inflatable air bag over the one-time use paper air bag; and (n) to provide for reliable freight protection device.

Further advantages are to provide inflatable air bags that can be made from any suitable material of engineering choice, such as plastic, vinyl, paper or the like. Further advantages are to provide lateral restraint and proper distribution of air bags using aligning flaps that can be fastened to each other using any suitable material of engineering choice such as a bungee cord, rubber band, rope, elastic material or the like. Further advantages are to provide vertical restraint and proper distribution of air bags using safety flaps that can be fastened to freight using any suitable material of engineering choice such as a bungee cord, rubber band, rope, elastic material or the like.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figures 13, 13A, 13B:
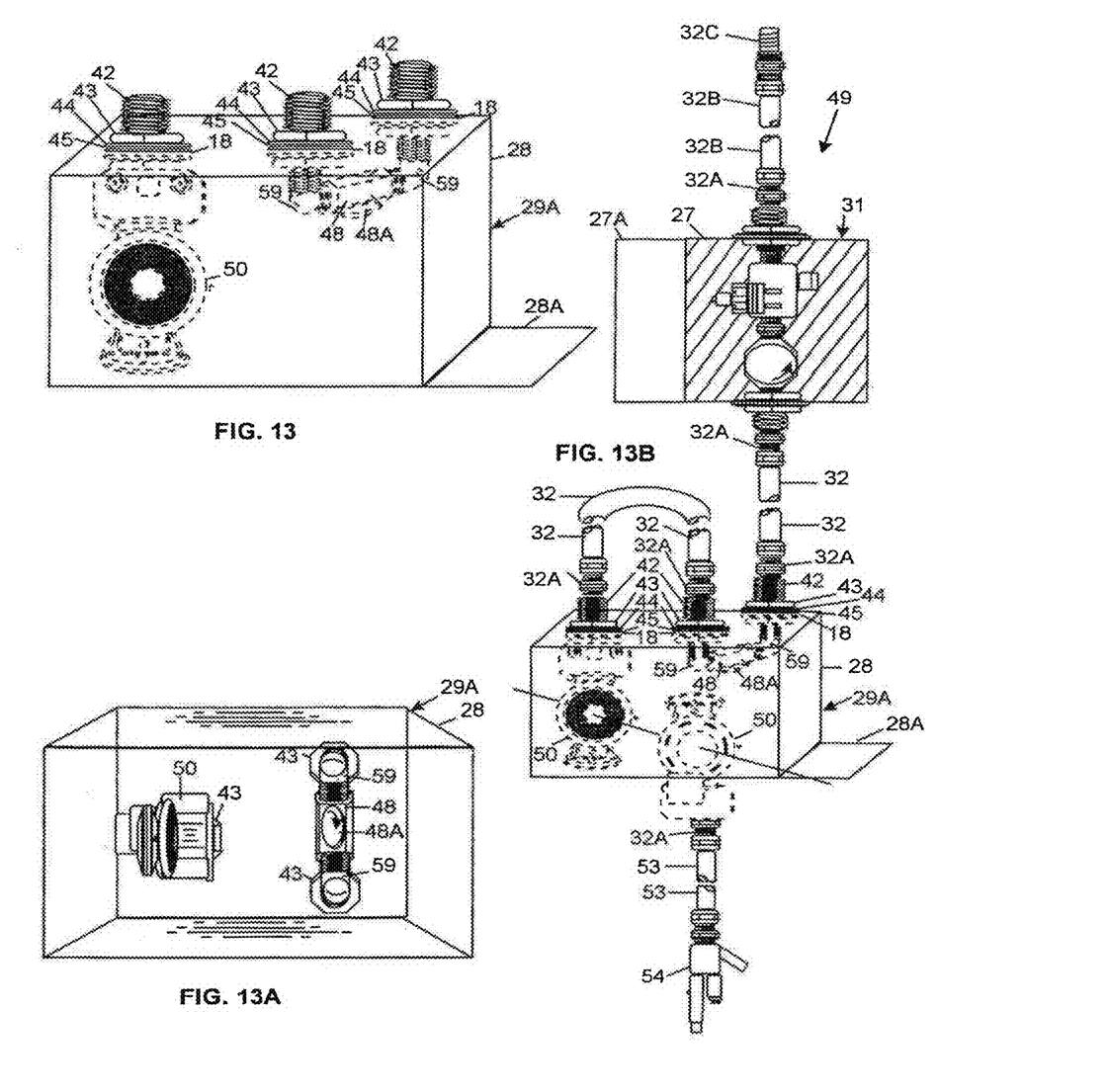
FIG. 13 is a side, perspective view of an alternative air coupled, including a glad hand.
FIG. 13A is a perspective view of the air coupler device of FIG. 13.
FIG. 13B is a side view of an alternative inflation system in accordance with the present invention, including the air coupler device of FIG. 13.
Figure 14:
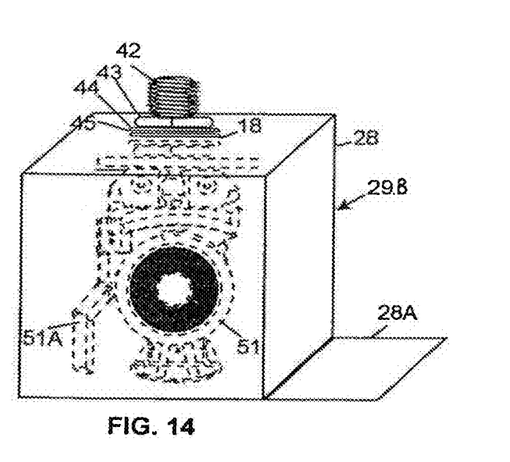
FIG. 14 is a side, perspective view of an alternative air coupler device, including a glad hand.

Referring now to the drawings, wherein like reference numerals designate corresponding structure throughout the views, and referring in particular to FIGS. 1 through 6A a pneumatic inflation system 49 for use with a freight carrier pursuant to a preferred embodiment of the present inventions; FIGS. 13 through 14B pursuant to an alternative embodiment of the present inventions; and FIGS. 15-22 pursuant to a further alternative embodiment of the present inventions. Various examples of a pneumatic inflation system are disclosed in U.S. Pat. Nos. 6,457,921 and 6,746,190, the entire contents of each of which are hereby incorporated by reference in their entirety.

Figure 1:
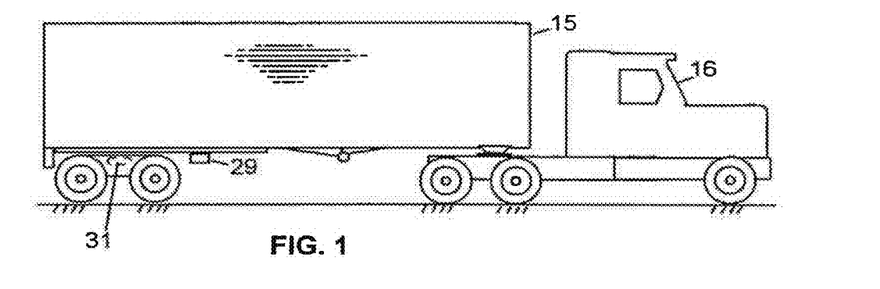
FIG. 1 is a side elevational view of a truck in combination with a semi-trailer and incorporating a trailer pneumatic inflation system in accordance with the present invention.
Figure 3:
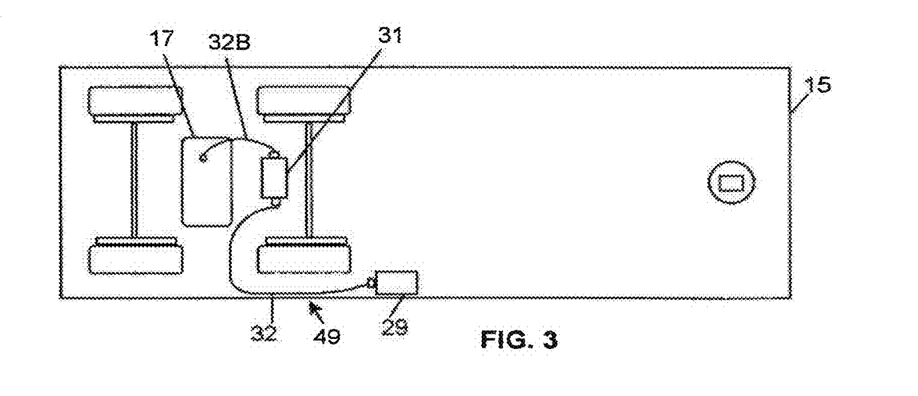
FIG. 3 a bottom view of the trailer of FIG. 1, including the inflation system in accordance with the present invention.

As a point of reference, the inflation system 49 is highly useful with the trucking industry. To this end, FIG. 1 shows a truck 16 in association with a freight carrier or trailer 15. Notably, the inflation system 49 can also be used with other types of freight carriers, such as any other container, cargo space, railroad car, or any other suitable transport container which may also be inside an aircraft or on a ship. By way of example, the instant transport container is intended to be part of a road vehicle. A tractor compressor (not shown) is driven by the truck's 15 engine (not shown) and supplies air to a pressurized air storage reservoir 17 (FIG. 3). Although not shown in the drawings for ease of illustration, air lines pass rearwardly from the tractor compressor to the air storage reservoir 17 through a tractor protection valve to a glad hand between the tractor 16 and trailer 15. As is known in the art, the air storage reservoir 17 is mounted to an underside of the trailer 15, and is normally used to control the trailer's 15 air brake and/or air suspension systems.

Figure 2:
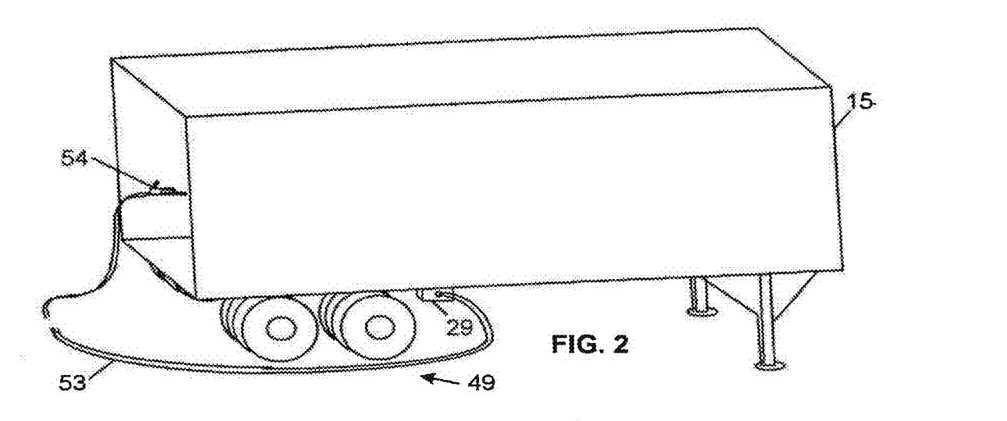
FIG. 2 is a schematic view of the trailer of FIG. 1.

With reference to FIGS. 2 and 3, the inflation system 49 of the present invention preferably includes an air control unit 31, an air coupling device 29 and an air hose 53. The air control unit 31 and the air coupling device 29 are mounted to an underside of the trailer 15 (shown best in FIG. 3), with the air control unit 31 preferably in close proximity to the air storage reservoir 17 and the air coupling device 29 adjacent one of the opposing sides of the trailer 15. The air control unit 31 is fluidly connected to the air storage reservoir 17 by tubing 32B, and supplies pressurized air to the air coupling device 29. The air hose 53, in turn, is fluidly connectable to the air coupling device 29, and is available for inflating or otherwise providing pressurized air to a wide variety of auxiliary components associated with the trailer 15, such as inflatable dunnage bags, pneumatic tools, tires, etc.

The air coupling housing 29 has an air hose adapter to receive the air hose 53 having an externally threaded fitting adapted to be connected to the main passage at the tapped portion of air coupler hosing 29. In a preferred embodiment, the hose 53 terminates at a nozzle apparatus 54 which is preferably in the form of a pistol-shaped nozzle, having a hand grip. Alternatively, the hose 53 can be connected to a wide variety of other devices.

FIG. 3 is an under side view of the trailer 15 incorporating the trailer pneumatic inflation system 49. As previously described, the trailer 15 has the air storage reservoir 17 that, for example, is coupled to an appropriate compressor on the truck 16 (FIG. 1), so that air pressure within the reservoir 17 may be maintained at a particular pressure, for example 120 psi. FIG. 3 shows a position of the air control unit 31 mounted within close proximity to the air storage reservoir 17. As is known in the art, the air storage reservoir 17 has one or more exit ports. An air line or tubing 32B fluidly connects one of these ports, and thus the air storage reservoir 17, to the air control unit 31. So as to minimize the opportunity for damage to the tube 32B, the air control unit 31 is mounted to the trailer 15 as close as possible to the air storage reservoir 17. In a preferred embodiment, then, the tubing 32B has a length less than approximately 12 inches.

The air coupler device 29 is located in the front of a trailer tandem coupled to a floor or slider box of a trailer 15 so that a dockworker in charge of loading a trailer has control in tapping an air source. To this end, the air coupler device 29 is preferably mounted to the trailer 15 adjacent one of the sides thereof. With this preferred location, the air coupler device is readily accessible by a user for connecting the hose 53 (FIG. 2) thereto. The air control unit 31 is fluidly connected to the air coupler device 29 by an air line or tubing 32.

Figure 4:
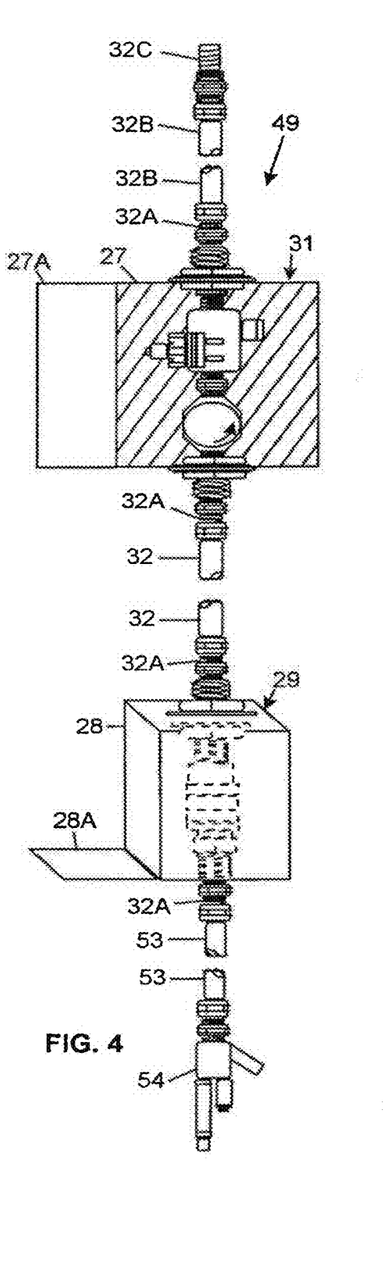
FIG. 4 an enlarged, cross-sectional view of an air control unit and air coupler device of the inflation system of FIG. 3.

FIG. 4 is a longitudinal cross-sectional view depicting one preferred embodiment of the pneumatic inflation system 49 in an open position. The air line 32B fluidly connects the air storage reservoir 17 (FIG. 3) to the air control unit 31 (an additional air line 32C may further be provided to complete this fluid connection). The second the air line 32 from the air control unit 31 provides controlled air flow to the air coupler device 29. Finally, the air hose 53 connects to the air coupler device 29 using a compressed air coupling. The air hose 53 is connected to the inflation nozzle apparatus 54, which is preferably in the form of a pistol-shaped nozzle, having a handgrip, supplied with compressed air from the hose 53.

Figure 5:
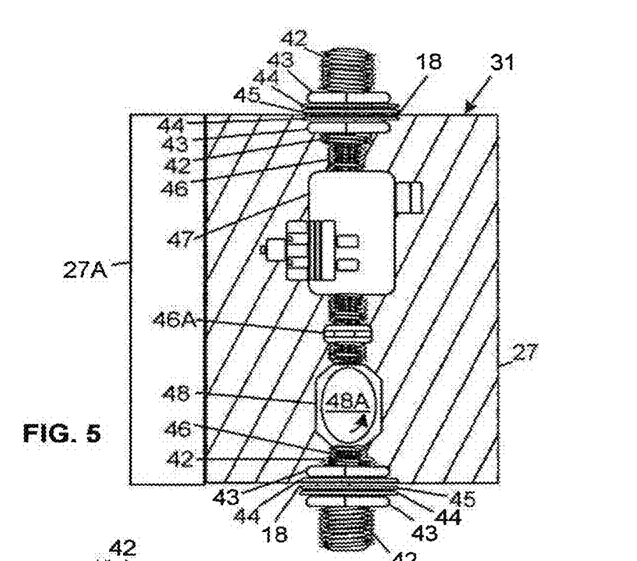
FIG. 5 is an enlarged, cross-sectional view of the air control unit of FIG. 4.

FIG. 5 is an enlarged, sectional view of one preferred embodiment of the air control unit 31. The air control unit 31 preferably includes an enclosure 27, a brake protection valve 47 and a control valve 48. The enclosure 27 of the air control unit 31 is constructed of corrosive resistant and temperature resilient material, such as stainless steel, aluminum, plastic, etc., with a door 27A having a latching mechanism (not shown) that provide a tight seal to keep the weather, road dust, corrosion, salt, debris and other foreign material from entering the enclosure 27. As previously described, the enclosure 27 is configured for mounting in close proximity to the air storage reservoir 17 (FIG. 3) of the trailer 15 (FIG. 3). The enclosure 27 forms openings 18 on each respective end. An externally and internally threaded, tubular shaft 42 is inserted through one (or top, relative to the orientation of FIG. 5) opening 18. On the outside of the enclosure 27, a sealing ring 45, a metal spacer 44, and a nut 43 having a threaded hole, encircle the threaded shaft 42. On the inside of the enclosure 27, a metal spacer 44 and a nut 43 having a threaded hole, encircle the threaded shaft 42. This allows the nuts 43 to be screwed tightly onto the enclosure 27 to provide an airtight seal. One end of a threaded nipple 46 is threaded into shaft 42 within enclosure 27 with another end threaded into the brake protection valve 47.

The brake protection valve 47 controls the flow of air into the pneumatic inflation system 49 and out of an air storage reservoir 17 (FIG. 3). Should the air pressure in the air storage reservoir 17 fall below 60 psi, the brake protection valve 47 will close, ceasing to allow air to pass from the air storage reservoir 17 into the inflation system 49. This will maintain enough air pressure in air storage reservoir for effective braking of the truck 16 and the trailer 15, shown in FIG. 1. Other system shut off pressure values, such as 50 psi or 40 psi, are equally acceptable. A threaded hex nipple 46A is threaded into another (preferably downstream) end of the brake protection valve 47 and one end of the control valve 48. The control valve 48 has an interior opening there through so that when it is aligned with an airline, the control valve 48 is open as shown in FIGS. 4 and 5. When a knob 48A is rotated a quarter turn, the control valve 48 is turned off. Thus, if the second air line 32 shown in FIG. 3 is damaged at any time, an operator of the equipment, dock person, or other personnel could rotate the knob 48A on the control valve 48 to shut off air completely within the air control unit 31, allowing the air storage reservoir 17 to return and maintain full psi. One end of threaded nipple 46 is threaded into the other side (preferably downstream) of the control valve 48 and into another externally and internally threaded, tubular shaft 42 (lower shaft 42 in FIG. 5). The threaded shaft 42 is inserted through the lower opening 18 in the enclosure 27. On the inside of enclosure 27, a nut 43 having threaded hole and a metal spacer 44 encircle threaded shaft 42. On the outside of the enclosure 27, a sealing ring 45, metal spacer 44, and nut 43 having threaded hole, encircle the lower threaded shaft 42. This allows nuts 43 to be screwed tightly onto enclosure 27 to provide an airtight seal.

During use and in accordance with one preferred embodiment, pressurized air is delivered from the air storage reservoir 17 (FIG. 3) to the air control unit 31. The air control unit 31 effectively defines an inlet (for example, the shaft 42 otherwise connected to the brake protection valve 47). Air flows from the inlet to the brake protection valve 47. Assuming sufficient pressure is present, the brake protection valve 47 allows the air to flow (downstream) to the control valve 48. If the control valve is "open," air flow continues downstream to an outlet defined by the air control unit 31 (for example, the shaft 42 fluidly connected downstream of the control valve 48). Thus, the air control unit 31 is configured to receive pressurized air from the air supply reservoir 17, and selectively allows the air to flow to the air coupler device (FIG. 4), depending upon operational parameters of the air storage reservoir 17 (via, for example, the brake protection valve 47) and manual or operator settings (via, for example, the control valve 48). Alternatively, a number of other designs for the air control unit 31 can be employed to achieve these objectives. For example, the brake protection valve 47 and the control valve 48 can be reversed and/or replaced with other component(s).

Figure 6:
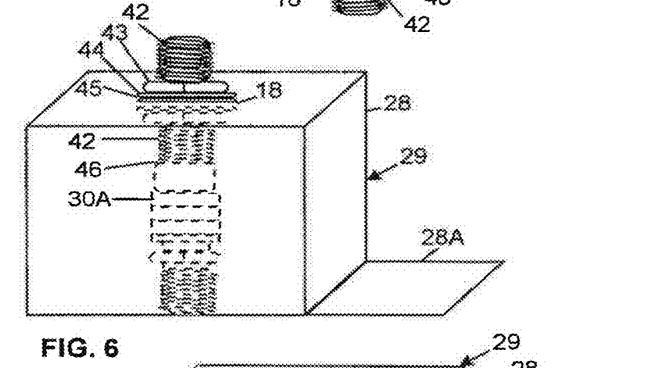
FIG. 6 is a side view of the air coupler device of FIG. 3.
Figure 6A:
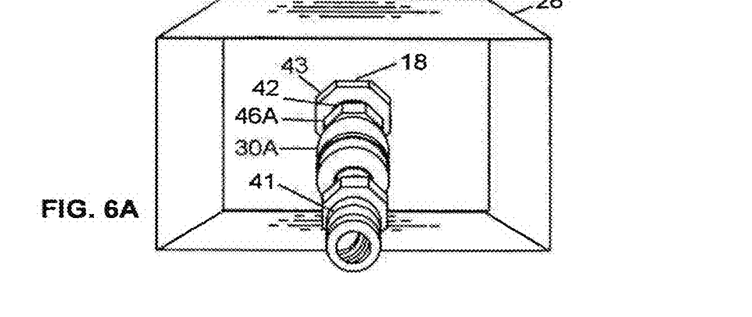
FIG. 6A is a perspective view of the air coupler device of FIG. 6.

FIGS. 6 and 6A are side and perspective views, respectively, of one preferred embodiment of the air coupler device 29. In general terms, the air coupler device 29 includes tubing for receiving air from the air control unit 31 (FIG. 5) and for selective fluid connection to the hose 53 (FIG. 2), along with an enclosure 28. The enclosure 28 is preferably constructed of corrosive resistant and temperature resilient material, such as stainless steel, aluminum, plastic, etc., and includes a door 28A having a latching mechanism (not shown) that provide a tight seal to keep weather, road dust, corrosion, salt, debris and other foreign material from entering the enclosure 28. The enclosure 28 is configured for mounting to the front of a trailer tandems coupled to a floor or slider box of a trailer 15 so that a person in charge of loading the trailer 15 has easy access to the air coupler device 29. The enclosure 28 preferably has one opening 18. An externally and internally threaded tubular shaft 42 is inserted through the opening 18, shown in FIG. 6, and defines an intake port. On the outside of the enclosure 28, a sealing ring 45, a metal spacer 44, and a nut 43 having a threaded hole, encircle the threaded shaft 42. On the inside of the enclosure 28, a metal spacer 44 and nut 43 having threaded hole, encircle threaded shaft 42. This allows nuts 43 to be screwed tightly onto enclosure 28 to provide an air tight seal. One end of a threaded hex nipple 46A is threaded into a downstream end of the shaft 42 within enclosure 28. Another end of the threaded hex nipple 46A is threaded into a female body section 30A of a valve quick disconnect coupling. A stem end (or exit port) of a male half 41 of a valve quick disconnect coupling connects to an air hose 53, shown in FIG. 2.

During use, the air coupler device 29 receives air, at the intake port, from the air control unit 31 when the air control unit 31 is "open". A user then selectively couples the hose 53 (FIG. 2) to the exit port of the air coupler device 29, such that when connected, the air coupler device 29 provides a conveniently accessible source of pressurized air. Thus, a user is not required to crawl under the trailer 15 (FIG. 2) to access the air coupler device 29. Further, by forming the air coupler device 29 to be separately positionable relative to the air control unit 31, the air control unit 31 can be positioned as close as possible to the air storage reservoir 17 (FIG. 3) without impeding the desired convenient access to a source of pressurized air. Notably, were the line 32 between the air control unit 31 and the air coupler device 29 severed or otherwise damage, the brake protection valve 47 (FIG. 5) would automatically shut the inflation system 49 off, so that the air supply reservoir would not drop below a minimum pressure level.

As described in greater detail below, the air coupler device 29 can assume a wide variety of forms other than the one preferred embodiment illustrated in FIGS. 6 and 6A. Regardless, the air coupler device 29 provides a conveniently accessible, pressurized air source for connection to the hose 53 (FIG. 3). The hose 53 can be used for a number of applications, including pneumatic tools, cleaning purposes, etc. In one preferred embodiment, the inflation system 49 is employed to inflate inflatable dunnage bags as described below.

Figure 7:
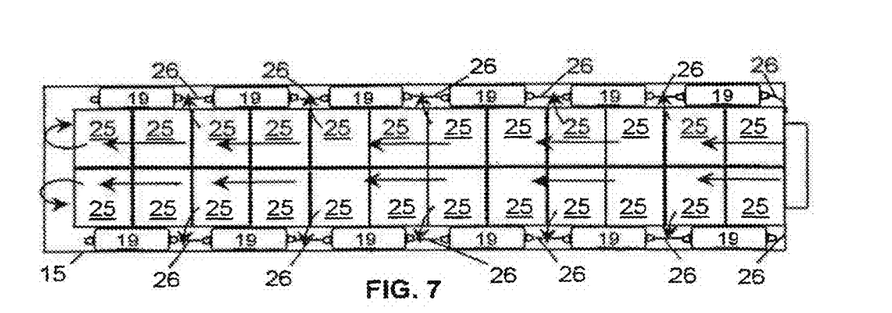
FIG. 7 is a top, schematic view of freight secured within a trailer by inflatable bags in accordance with the present invention.

FIG. 7 is a top view of freight, such as pallets, 25 (twenty four are shown) arranged in a center-line configuration between trailer walls of cargo space and secured by a plurality of center-lining air bags 19 in accordance with the present invention. Arrows indicate a flow pattern of refrigerated air passing within the trailer 15 to cool the freight 25. Narrow voids between walls of the trailer 15 and cartons on pallets 25 arranged two abreast are occupied by the center-lining air bags 19. Bungee cords, rubber bands, ropes or other suitable elastic material 26 are attached to each of the air bags 19 and can be used as guides to ensure proper distribution of the bags 19 within the trailer 15 and provide lateral restraint evenly throughout the trailer 15.

Figure 8:
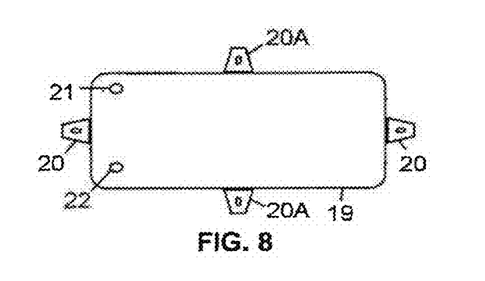
FIG. 8 is a side view of an air bag in accordance with the present invention.

FIG. 8 shows one preferred embodiment of the air bag 19 as being an elongated inflatable reusable sleeve made of durable flexible plastic, rubber elastomeric material (which returns to its original shape) or from inflatable cloth-like material. The air bag 19 preferably includes an inflation valve 22, a deflation or exhaust valve 21, aligning tabs 20 and safety or latching tabs 20A. The aligning tabs 20 are affixed to opposite sides of the air bag 19 and form an opening therein. The safety or latching tabs 20A are affixed to a top and bottom, respectfully, of the bag 19. Bungee cords, rubber bands, ropes or other suitable elastic material 26 (FIG. 7) may be utilized to fasten the bags 19 to each other via the aligning tabs 20 within a cargo trailer 15, where desired, to provide lateral restraint and proper distribution of the bags 19. Further, bungee cords, rubber bands, ropes or other suitable elastic material may be utilized to fasten the bag 19 to the freight 25 within the trailer 15, where desired, to provide vertical restraint and proper distribution the bag 19 between the freight 25 and the trailer 15, as described below.

Figure 9:
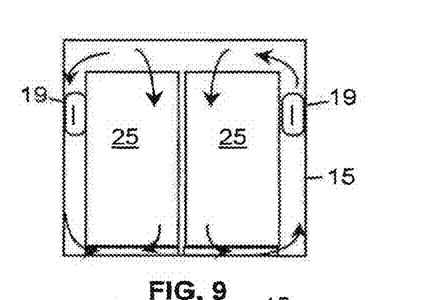
FIG. 9 is a rear view of the tractor-trailer of FIG. 7.

FIG. 9 is a rear view of the trailer 15 with the freight 25 centerlined and secured by the invention. Arrows indicate a flow pattern of refrigerated air. Narrow voids between walls of a truck trailer and cartons on the freight 25 arranged two abreast are occupied by one of the inflatable center-lining air bags 19.

Figure 10:
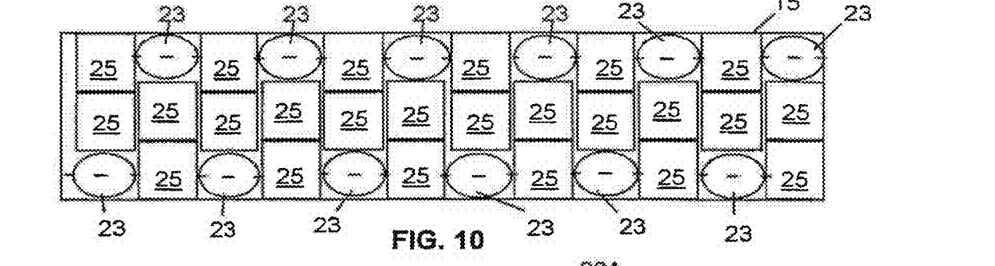
FIG. 10 is a top, schematic view of freight stagger loaded and secured within a trailer.

FIG. 10 is a top view of freight, such as pallets, 25 (twenty four are shown) arranged in a staggered configuration between walls of the trailer 15 of a cargo space and secured by air bags 23. The air bags 23 are highly similar to that previously described, but are under 6 feet in height. Narrow voids between walls of a transport container and cartons on pallets arranged two abreast are occupied by the air bags 23. In accordance with the present invention, lateral shifting of cargo is avoided or reduced by providing a plurality of inflatable air bags 23 or 24 depending upon the height of the cargo.

Figure 11:
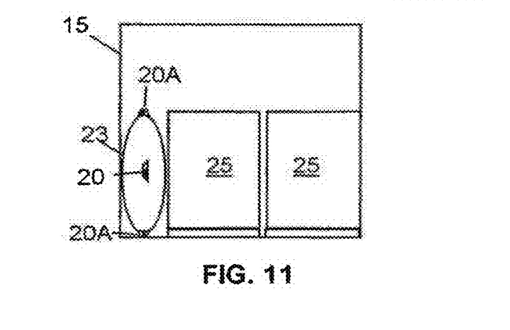
FIG. 11 is a rear view of a tractor-trailer with short cargo secured by inflatable bags in accordance with the present invention.
Figure 12:
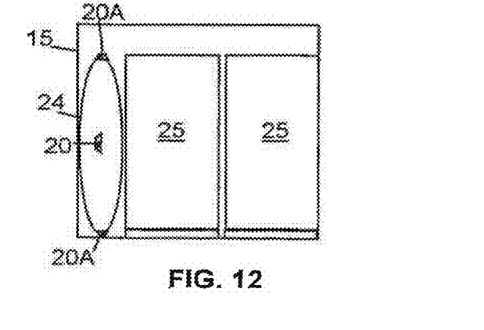
FIG. 12 is a rear view of the tractor-trailer with tall cargo secured by inflatable bags in accordance with the present invention.

FIG. 11 and FIG. 12 show a rear view of the trailer 15 with short palletize cargo 25 and tall palletized cargo 25, respectively, and secured by air bags 23, 24, respectively. Narrow voids between walls of the trailer 15 and the freight 25 arranged two abreast are occupied by inflatable, under six feet tall, air bags 23 (FIG. 11) or over six feet tall air bags 24 (FIG. 12). Selection of the appropriate air bag will depend upon height of the freight 25. In either case, the safety latching tabs 20A are available for securing the bags 23 or 24 to the freight 25, such as with a rope, bungee cord, etc. (not shown). Unlike other available dunnage bags, the safety latching tabs 20A, in conjunction with the coupling device (e.g., rope, bungee cord, etc.), prevents the bag 23, 24 from sliding downwardly during transit.

Returning to FIGS. 1-3, as previously described, the inflation system 49 can assume a wide variety of forms. With specific reference to the air coupler device 29, existing components of the trailer 15, such as a glad hand, can be utilized by, an incorporated into, the present invention. In this regard, FIG. 13 and FIG. 13A are side and perspective views, respectively, of an alternative embodiment air coupler device 29A. The air coupler device 29A includes the enclosure 28 as previously described, tubing, and a glad hand 50. The enclosure 28 preferably has three openings 18. Externally and internally threaded, tubular shafts 42 are inserted through each of the openings 18, as shown in FIG. 13. On the outside of the enclosure 28, a sealing ring 45, a metal spacer 44, and nut 43 having a threaded hole, encircle each of the threaded shafts 42. On the inside of the enclosure 28, a metal spacer 44 and a nut 43 having threaded hole, encircle each of the threaded shafts 42. This allows nuts 43 to be screwed tightly onto the enclosure 28 to provide an air tight seal. One of the shafts 42 is connected to the glad hand 50, while the other two shafts are fluidly connected by a valve plug 48, including elbow nipples 59. The valve plug 48 includes a control 48A for manually opening and closing the valve plug 48.

As shown in FIG. 13B, the air coupler device 29A is fluidly connected to the air control unit 31 at an intake port (defined by one of the tubular shafts 42 as illustrated in FIG. 13B). Air flows from the intake port through the valve plug 48 (which an operator can manually turn on or off). Assuming the valve plug 48 is open, air flows to the glad hand 50, such as by tubing 32. Finally, the glad hand 50 is selectively connectable to the hose 53 (for example, via line 32A) for supplying pressurized air to the hose 53. Glad hands, such as the glad hand 50, are well known in the art. The glad hand 50 serves as the exit port for the air coupler device 29A.

Figure 14A:
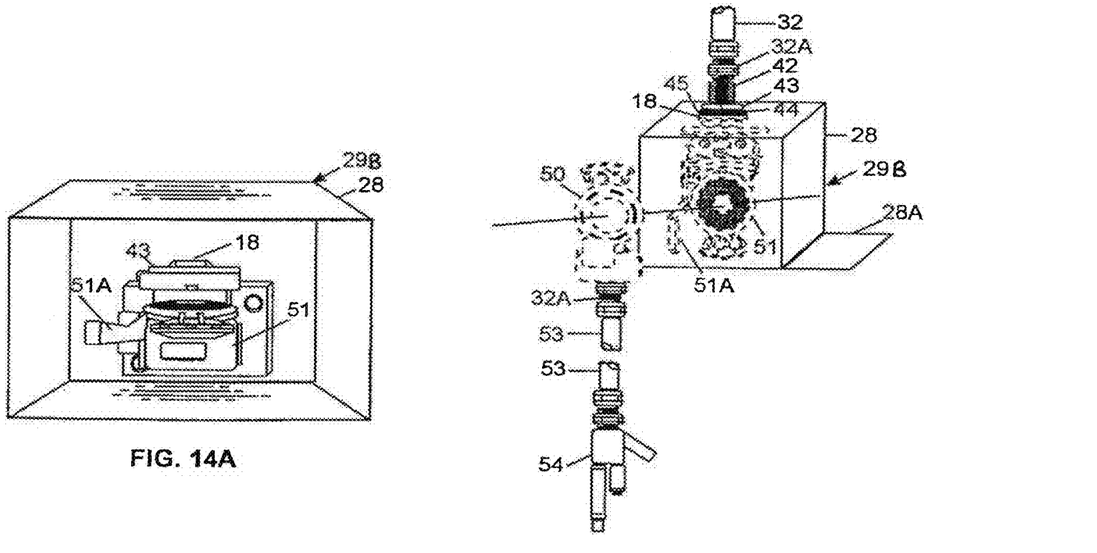
FIG. 14A is a perspective view of the air coupler device of FIG. 14.
Figure 14B:
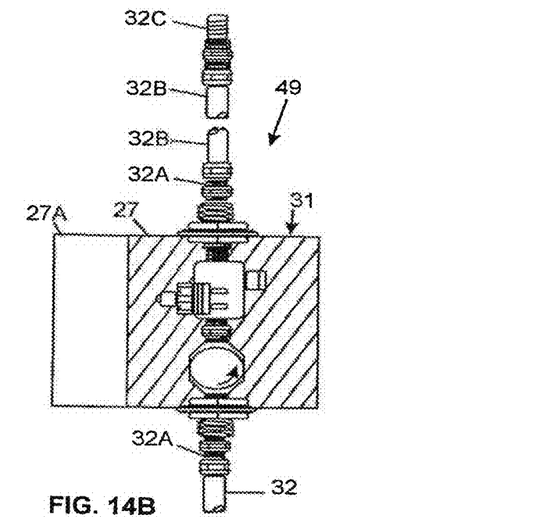
FIG. 14B is a side view of an alternative inflation system in accordance with the present invention, including the air coupler device of FIG. 14.

FIGS. 14 and 14A are side and perspective views, respectively, of another alternative embodiment air coupler device 29B. The air coupler device 29B includes an enclosure 28 and a glad hand 51. The enclosure 28 preferably has one opening 18. An externally and internally threaded, tubular shaft 42 is inserted through the opening 18, as shown in FIG. 14A. On the outside of the enclosure 28, a sealing ring 45, a metal spacer 44, and nut 43 having a threaded hole, encircle the threaded shaft 42. On the inside of the enclosure 28, metal spacer 44 and nut 43 having threaded hole, encircle the threaded shaft 42. This allows nuts 43 to be screwed tightly onto the enclosure 28 to provide and air tight seal. Another end of threaded hex nipple 46A is threaded into the glad hand 51. In the embodiment of FIGS. 14 and 14A, the glad hand 51 is of a type known in the art and includes a shut off valve 51A. As is known in the art, the valve 51A can be manually operated to control air flow through the glad hand 51.

As shown in FIG. 14B, the air coupler device 29B is fluidly connected to the air control device 31 for receiving pressurized air therefrom. In this regard, the glad hand 51 provides the intake port, via the tubular shaft 42, for the air coupler device 29B. Further, the glad hand 51 provides the exit port, via the line 32A, for selectively delivering pressurized air to the hose 53 upon connection of the hose 53 to the glad hand 51 and activation of the shut off valve 51A.

As shown in FIGS. 15-22, according to one or more examples of embodiments, the pneumatic inflation system 49 described herein may comprise more than one inflation unit or fill stations 101 coupled to and Tillable through a single control fluidly coupled to the air control device 31 or air storage reservoir 17.

Figure 15:
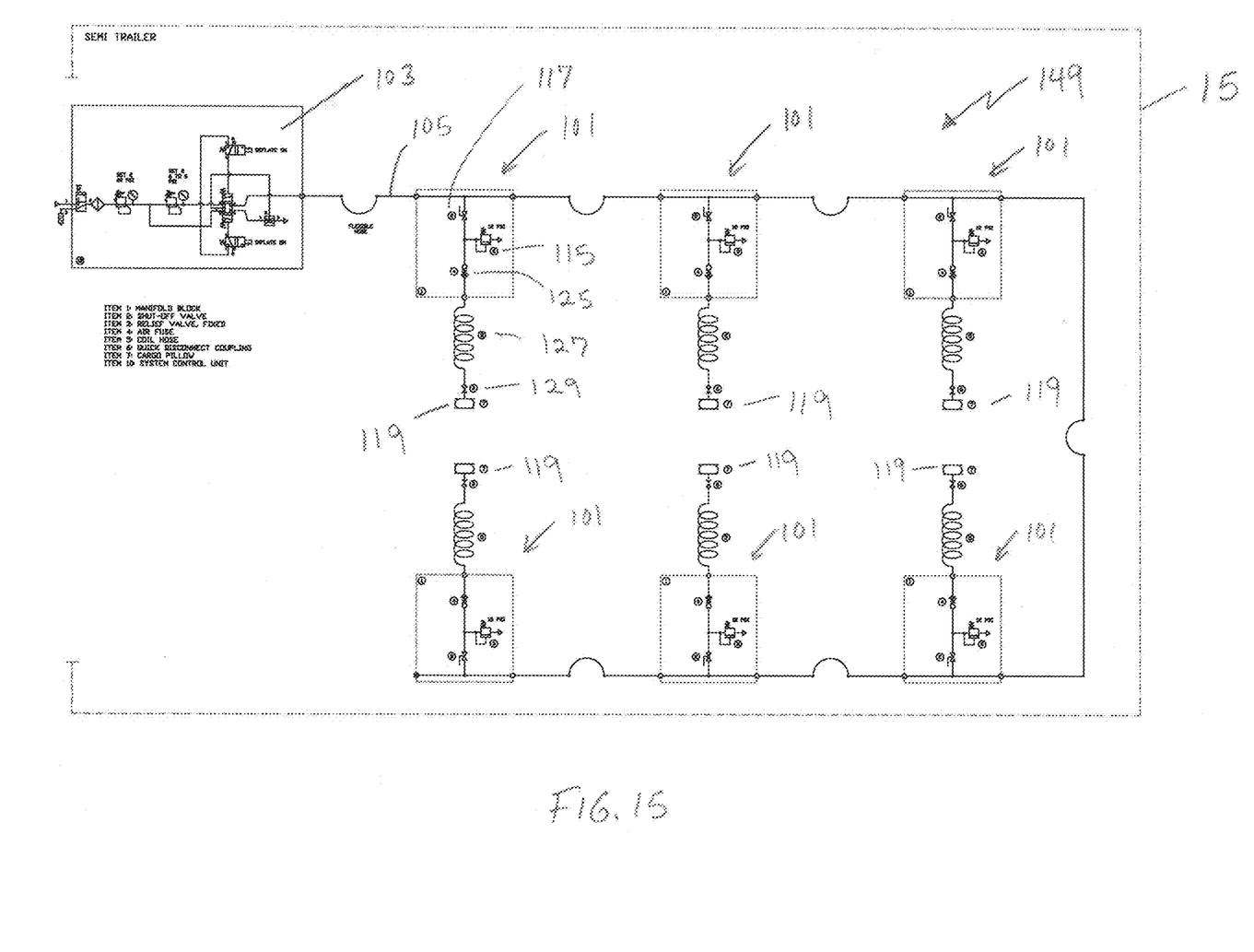
FIG. 15 is a schematic of one example of a multi-air bag trailer pneumatic inflation system according to one or more examples of embodiments.
Figure 16:
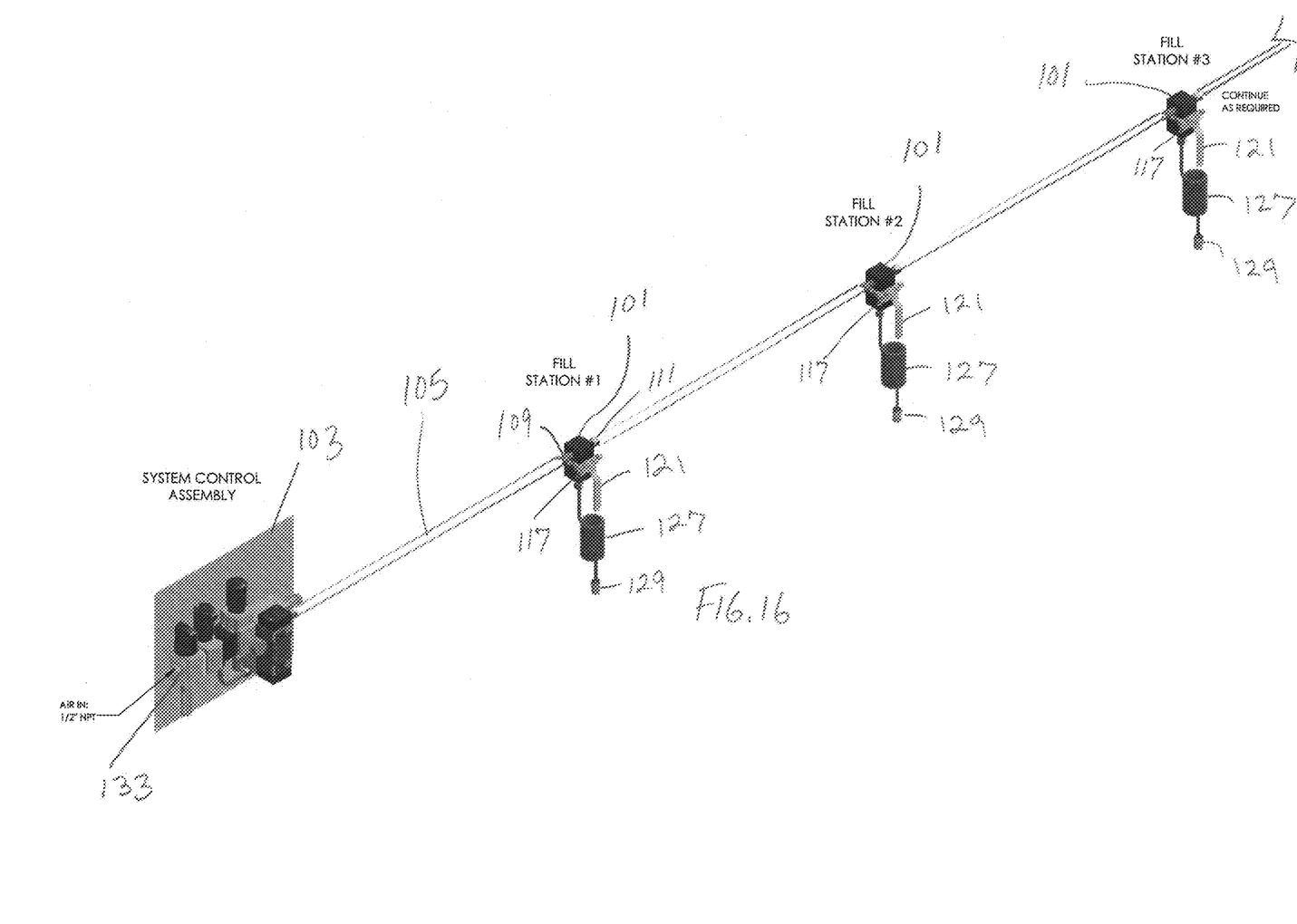
FIG. 16 is a partial perspective view of the multi-air bag trailer pneumatic inflation system of FIG. 16 according to one or more examples of embodiments.
Figure 17:
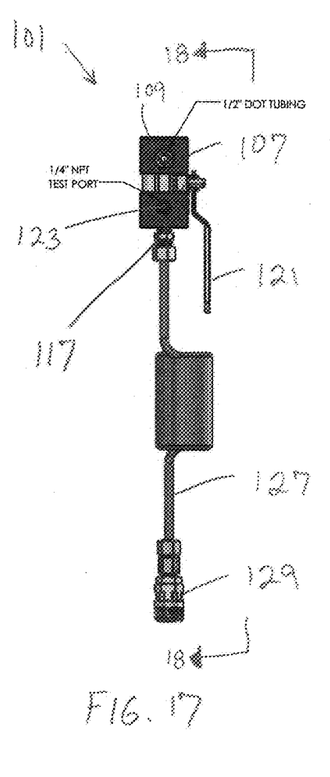
FIG. 17 is an elevation view of an example of a fill station or inflation unit for use with a multi-air bag trailer pneumatic inflation system as shown in FIGS. 15-16 according to one or more examples of embodiments.
Figure 18:
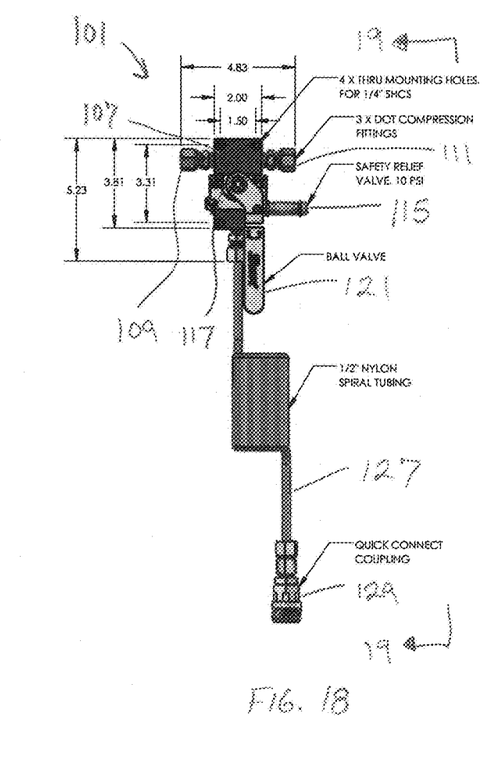
FIG. 18 is an elevation view of the example of a fill station or inflation unit shown in FIG. 17, taken from line 18-18 of FIG. 17.
Figure 19:
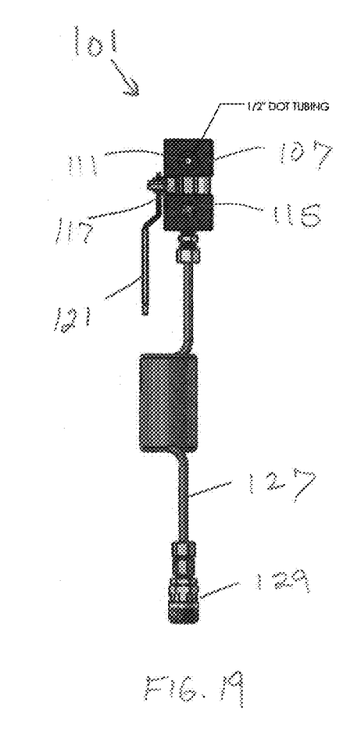
FIG. 19 is an elevation view of the example of a fill station or inflation unit shown in FIG. 17, taken from line 19-19 of FIG. 18.

Referring to FIG. 15-16, a schematic diagram and partial perspective view of a multi-air bag trailer pneumatic inflation system 149 is shown. As can be seen, the pneumatic inflation system 149 includes a plurality of air bags 119 which may be spaced about the trailer. The air bags 119 may be similar to any of the air bags described herein (e.g., 19, 23, 24). The air bags 119 may be located in any suitable location for the purpose of the trailer 15 and securement of the load carried thereby. The plurality of air bags 119 are fluidly connected. In the illustrated example shown in FIG. 15, each air bag 119 may be fluidly connected or coupled to a fill station 101. Accordingly, a plurality of fill stations 101 may be spaced throughout the trailer 15 in suitable locations for use and coupleable to the plurality of air bags 119. According to one or more examples of embodiments, each air bag 119 is joined to and fluidly coupled to the system control 103 of the pneumatic inflation system 149 through the inflation unit or fill station 101, each of which is fluidly joined to the control unit 103 and one or more additional inflation units or fill stations 101 by, for example, a hose 105 which may be a flexible hose, or other conduit suitable for the transmission of fluid, such as air.

Referring to FIGS. 15-19 each fill station 101 or inflation unit includes a manifold block 107. The manifold block 107 includes an inlet/outlet 109, which may be compression fitting, for coupling or receipt of the hose 105 or conduit end. In the illustrated examples, two compression fittings are provided in an opposed relation, and may be fluidly connected to each other by a tube or hose or conduit, so as to form an additional inlet/outlet 111 for connection of an additional fill station 101 or inflation unit. While a specific example is illustrated, it is understood that one compression fitting or inlet/outlet (for example on an end unit) or more than two (2) compression fittings or inlet/outlets (for example, for coupling to multiple hoses and/or fill stations 101) may be used. The inlet/outlet 109, 111 may be further fluidly coupled to a tube or hose or conduit 113 which is in communication with the hose 105 (e.g., flexible hose).

A safety relief valve 115 may also be provided. For example, the safety relief valve 115 may be a pressure relieve value used to control or limit the pressure in the system 149, or for example, in the air bag 119. In this regard, pressure is relieved by allowing the pressurized fluid (e.g., air) to flow from an auxiliary passage out of the system. The relief valve 115 is designed or set to open at a predetermined set pressure to protect the air bag 119, as well as other components of the system and other equipment, from being subjected to pressures that exceed their design limits or predetermined limits. When the set pressure is exceeded, the relief valve 115 becomes a path of least resistance as the valve is forced open and a portion of the fluid is diverted through the auxiliary route. In one example, the safety relief valve 115 (which may be a fixed valve) is a 10-12 PSI valve. As the fluid is diverted, the pressure inside the system will stop rising. Once it reaches the valve's reseating pressure, the valve may close.

The manifold 107 may also include a ball valve, or shut-off valve 117, for manually opening and closing the valve, and thus the fluid connection to the hose 105 and air bag 119. This valve 117 may be coupled to and operable by a handle 121. A test port 123 may also be provided on the manifold 107 such as in FIG. 16, and an air fuse 125 may also be provided, such as shown in FIG. 15. For example, an air fuse 125 may be provided so as to immediately shut off the flow of air in the event pressure exceeds a set value.

The manifold block 107 is coupled to a coil hose 127, or retractable hose, or other fluid transfer device for transfer of air, and in fluid communication with said hose 105 or device 103, such that fluid or air transmitted from/to the inlet/outlet 109, 111 may be transmitted through the hose 127. The hose 127 has on its end a coupling 129, such as a quick disconnect coupling, that may couple to the air bag 119. While a single hose 127 is shown, in one or more examples of embodiments, more than one hose or fluid transfer device may be joined to the manifold block 107. Accordingly, an air bag 119 or more than one air bag 119 may be coupled to the hose(s) 127 for inflation or deflation thereof.

As indicated, the pneumatic inflation system 149 may include a plurality of air bags 119 which may be spaced about the trailer 15, and a plurality of fill units or fill stations 101 spaced throughout the trailer 15. The air bags 119 may be located in any suitable location for the purpose of the trailer 15 and securement of the load carried thereby. According to one or more examples of embodiments, each fill station 101 or inflation unit may be attached, and in some examples removably attached, to the trailer 15. For example, a fill station 101 may be attached to a trailer sidewall, or roof, or a frame member thereof. Likewise, one or more fill stations 101 may be attached to the front wall or rear wall/door of the trailer 15. In one or more further examples of embodiments, a fill station 101 or more than one fill station may be moveable. For example, a track system may be provided on the trailer and the one or more fill stations 101 may be slidable on the track. For instance, one or more tracks may be provided on sidewalls, rear wall, front wall, doors, and/or the ceiling of the trailer. In one or more additional examples of embodiments, temperature probes, sensors and other data collection devices may be used in the trailer and attached to the track system. Likewise, an aspiration system for air and/or moisture delivery and control may also be attached to the track system or otherwise deployed in connection with the system described herein.

In some examples of embodiments, the hose 127 may be retractable, or the manifold block 107 itself may be on a retractable system, such that the hose 127 can be positioned to reach an airbag 119 placed a distance away. With the foregoing in mind, the air bags 119 may be selectively moved, filled, and used in any location within the trailer. In another example, the fill stations may be "low profile" such that they have a generally narrow width and do not interfere with the cargo. While specific examples of embodiments are described above, the inventions are not limited thereto as one of skill in the art would appreciate alternatives may accomplish the same objectives set forth herein.

Moreover, each fill station 101 may be separately and removably coupled to the system control unit 103. Referring to FIGS. 15-16 and 20-22, the system control unit 103 has a plurality of components mounted to a distribution block 131, which may be mounted to the trailer 15 in any suitable location. In one example of embodiments, the system control unit 103 is mounted toward the rear of the trailer 15. In another example of embodiments, the system control unit 103 is mounted in proximity to the air control unit 31 and/or air storage reservoir 17. However, any location suitable for use may be acceptable and one or more components of the system control unit 103 may be separately mounted or contained within or externally of the trailer 15 and joined to the system 149.

Figure 20:
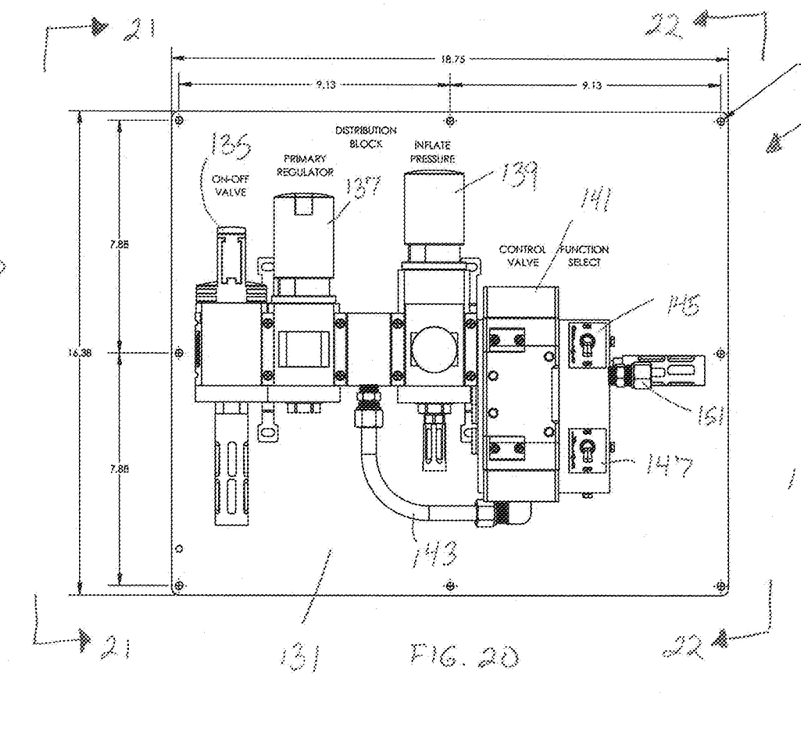
FIG. 20 is an elevation view of a system control assembly for use with a multi-air bag trailer pneumatic inflation system shown in FIGS. 15-16 according to one or more examples of embodiments.
Figure 21:
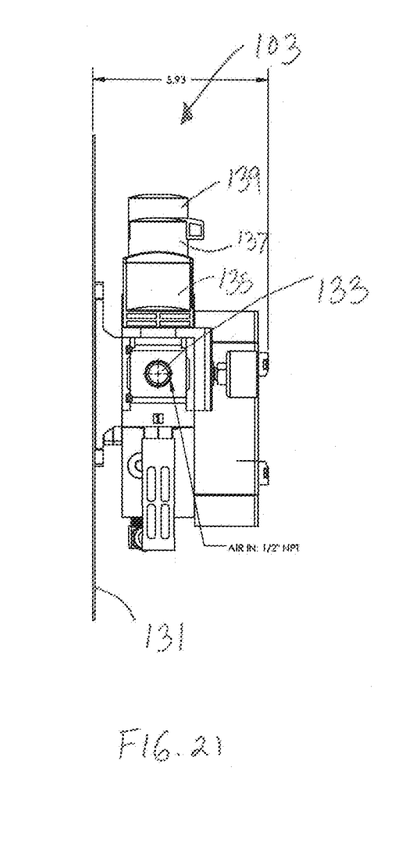
FIG. 21 is an elevation view of a system control assembly shown in FIG. 20, taken from line 21-21 of FIG. 20.
Figure 22:
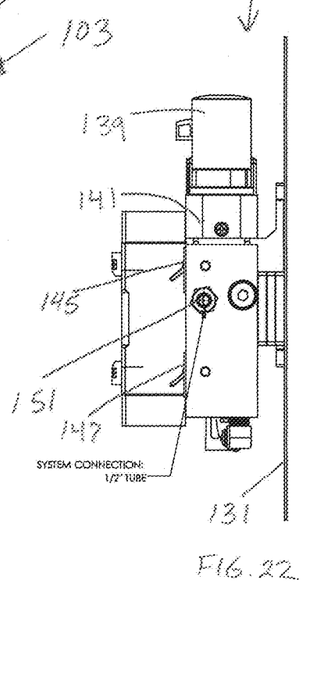
FIG. 22 is an elevation view of the system control assembly shown in FIG. 20, taken from line 22-22 of FIG. 20.

In one or more examples of embodiments, and as can be seen in reference to FIGS. 20-22, the system control unit 103 has an air inlet 133. The air inlet 133 may be fluidly coupled, and/or removably coupled, to the air control unit 31 and/or air storage reservoir 17. In one example, a hose or other fluid transfer device (not shown) may be joined between the air inlet of the system control unit 103 and the air control unit 31 and/or air storage reservoir 17. The air inlet 133 of the system control unit 133 is in fluid connection with an on-off valve 135. The on-off valve 135 may control the operation (on or off) of the system control unit 103 and air or fluid transfer within the pneumatic system 149. A primary regulator 137 may be provided in or in association with the system control unit 103. The primary regulator 137 may function to match the flow of air through the regulator to the demand for air placed upon it and maintain a constant output pressure. For example, if the load flow decreases, then the regulator flow may decrease to accommodate same, and conversely, if the load flow increases, then the regulator flow may increase to maintain controlled pressure from decreasing due to a shortage of air in the system. To this end, the primary regulator 137 may have a restricting element or valve that may provide a variable restriction to the flow; may have a loading element that may apply the needed force to the restricting element; and a measuring element that functions to determine when inlet flow is equal to outlet flow (e.g., a diaphragm). In one or more examples of embodiments, the primary regulator 137 may be set to, for example, 60 psi. An inflation pressure tank 139 or pump or other device capable of inflating the pressure of the system 149 may also be provided in, on, or in association with the distribution block 131 of the system control unit 103 and in communication with the primary regulator 137. In one or more examples of embodiments, for example, the inflation pressure tank 139 may be set to 6 to 8 psi. A control valve 141 may be in communication with the inflation pressure tank 139 and/or primary regulator 137, and may be used to control fluid or air flow (and in particular flow rate), e.g., such as by varying the size of the flow passage as directed by a signal from a controller or other device (e.g., a signal may be based upon a pressure range). The control valve 141 may be an automatic control valve, which may be opened or closed by electrical, hydraulic or pneumatic actuators. In one example of embodiments, the valve 141 is an air-actuated valve, although variations thereon may also be acceptable. The control valve 141 may include a valve actuator (which moves the modulating element), a valve positioner (which ensures the valve has reached the desired degree of opening), and a valve body (which may be the container for the various components of the valve). A bypass 143 may also be provided between the control valve and the primary regulator as can be seen in FIG. 20. In addition to the foregoing, one or more toggle valves 145, 147 may be provided with a function selection control for activating either air flow into and inflation of, or vacuum on and deflation of the coupled air bags 119.

Thus, in one example of embodiments, the system control unit 103 comprises an inlet 133 for coupling to the air supply with an on/off valve 135 for providing a flow of air, a primary regulator 137 in communication with the flow of air and the on/off valve, an inflation pressure tank 139 in communication with the flow of air and the primary regulator, a control valve 141 in communication with the inflation pressure tank and/or primary regulator, and used to control the air flow, a function selection valve 145, 147 for selecting between inflation and deflation, and an outlet 151.

A system connection inlet/outlet 151, which may be a hose coupling, is also attached to the system control unit 103. As can be seen in reference to FIG. 16, a hose 105 or other fluid transfer device is coupled to the system connection inlet/outlet 151 and one or more fill stations 101. Additional fill stations 101 may be further connected to either the fill station manifold block 107 or the system control assembly (not shown) through like means. Any one or more of the fill stations 101 may be connected or disconnected, depending upon the configuration of air bags 119 in the trailer 15 desired by the user.

Accordingly, in one example of use of the system described herein, air or fluid may be added to the system 149 by the system control assembly 103 delivering air through the air inlet 133 which is fluidly coupled, and/or removably coupled, to the air control unit 31 and/or air storage reservoir 17. Air is transferred from the system control assembly 103 to the fluidly coupled fill stations 101 (which are in the "on" position, e.g., a shut of valve is in the open position) and into the coupled air bag(s) 119, thereby inflating the air bags 119. Air may be added to the air bags 119 until the system detects that the air bags 119 have reached their maximum capacity, such as for example by release of air through one or more pressure relief valves on the fill stations 101, or action of the primary regulator and/or control valve on the system control unit. The air may be manually shut off (and/or on) and may also be automatically turned on or off and the pressure in the system and air bags 119 maintained by the interaction of the respective valves in the control unit and the fill station(s) 101. In one or more further embodiments, the air may be removed from the air bags 119 and system by actuation of the deflation toggle switch 145 or 147, which in some examples, may cause a vacuum to draw air from the system.

As indicated, advantageously the system control unit and fill stations may automatically maintain the amount of air in the air bags through the use of the various components as described herein which regulate the air pressure, and provide, for example pressure relief. Advantageously, the system described herein is not tied to a compressor or the compressor of the vehicle. Instead, the automated system works off of the trailer air control unit and/or air storage reservoir. Moreover, the system does not require additional electronics or power to be supplied to the system in order to fill or maintain the pressure in the system.

While a "trailer" is described for purposes of example, it will readily understood that the pneumatic inflation systems described herein may be adapted to a variety of uses and situations where it is desired to fill void space.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A multi-air bag pneumatic inflation system for a tractor trailer comprising:
   a pressurized air storage reservoir mounted to an underside of the trailer;
   a tractor compressor driven by a truck engine which supplies air to the pressurized air storage reservoir;
   a system control unit mounted to the trailer and coupled to the pressurized air storage reservoir, the system control unit being configured to control the flow of pressurized air in the pneumatic inflation system;

a plurality of fill stations spaced and attached throughout the trailer and fluidly coupled to the system control unit, one or more fill stations of said plurality of fill stations fluidly coupled to an air bag for inflation and deflation thereof; and wherein the system control unit has a primary regulator that matches a flow of air to a demand for air to maintain a constant output pressure.

2. The multi-air bag pneumatic inflation system of claim 1, wherein the plurality of fill stations each have an air bag fluidly coupled thereto for inflation and deflation of the air bag.

3. The multi-air bag pneumatic inflation system of claim 1, wherein the system control unit comprises:
an inlet coupling the air supply with an on/off valve for providing a flow of air;
the primary regulator being in communication with the flow of air and the on/off valve;
an inflation pressure tank in communication with the flow of air and the primary regulator;
a control valve in communication with the inflation pressure tank and/or primary regulator, and used to control the air flow;
a function selection valve for selecting between inflation and deflation; and
an outlet.

4. The multi-air bag pneumatic inflation system of claim 1, wherein the fill station comprises:
a manifold block, including a first inlet/outlet for fluidly coupling to the system control unit for transmission of the air supply;
a safety relief valve joined to the manifold in fluid communication with the air supply;
a shut-off valve for manually opening and closing the fluid connection between the manifold and the air bag; and
a hose in fluid communication with the manifold and the air bag for transfer of the air supply to the air bag.

5. The multi-air bag pneumatic inflation system of claim 4, further comprising a second inlet/outlet for fluidly coupling to an additional fill station from the plurality of fill stations.

6. The multi-air bag pneumatic inflation system of claim 4, further comprising a test port provided on the manifold.

7. The multi-air bag pneumatic inflation system of claim 4, further comprising an air fuse provided on the manifold.

8. The multi-air bag pneumatic inflation system of claim 4, wherein the hose has on its end a quick disconnect coupling that removably couples to the air bag.

9. The multi-air bag pneumatic inflation system of claim 1, wherein the system control unit is fluidly coupled to a fill station of the plurality of fill stations by a hose.

10. The multi-air bag pneumatic inflation system of claim 1, wherein the fill station is fluidly coupled to the air bag by a hose.

11. The multi-air bag pneumatic inflation system of claim 1, wherein the plurality of air bags spaced about the trailer.

12. An automatic multi-air bag pneumatic inflation system for a trailer comprising:
a pressurized air storage reservoir mounted to an underside of the trailer;
a tractor compressor driven by a truck engine which supplies air to the pressurized air storage reservoir; a system control unit coupled to an air supply for controlling the flow of pressurized air in the pneumatic inflation system, wherein the system control unit comprises:
an inlet for coupling to the air supply with an on/off valve for providing a flow of air;
a primary regulator in communication with the flow of air and the on/off valve;
an inflation pressure tank in communication with the flow of air and the primary regulator;
a control valve in communication with the inflation pressure tank and/or primary regulator, and used to control the air flow;
a function selection valve for selecting between inflation and deflation; and
an outlet;
a plurality of fill stations fluidly coupled to the system control unit and attached to the trailer, one or more fill stations of said plurality of fill stations fluidly coupled to an air bag for inflation and deflation thereof, wherein said one or more fill stations comprise:
a manifold block, including a first inlet/outlet for fluidly coupling to the system control unit for transmission of the air supply;
a safety relief valve joined to the manifold in fluid communication with the air supply;
a shut-off valve for manually opening and closing the fluid connection between the manifold and the air bag; and
a hose in fluid communication with the manifold and the air bag for transfer of the air supply to the air bag
wherein the plurality of air bags which are spaced about the trailer, and a plurality of fill stations are spaced throughout the trailer.

13. The automatic multi-air bag pneumatic inflation system of claim 12, wherein the plurality of fill stations each have an air bag fluidly coupled thereto for inflation and deflation of the air bag.

14. The automatic multi-air bag pneumatic inflation system of claim 13, further comprising a second inlet/outlet for fluidly coupling to an additional fill station from the plurality of fill stations.

15. The automatic multi-air bag pneumatic inflation system of claim 13, further comprising a test port provided on the manifold.

16. The automatic multi-air bag pneumatic inflation system of claim 13, further comprising an air fuse provided on the manifold.

17. The automatic multi-air bag pneumatic inflation system of claim 13, wherein the hose has on its end a quick disconnect coupling that removably couples to the air bag.

18. The automatic multi-air bag pneumatic inflation system of claim 12, wherein the system control unit is fluidly coupled to a fill station of the plurality of fill stations by a hose.

19. The automatic multi-air bag pneumatic inflation system of claim 12, wherein the fill station is fluidly coupled to the air bag by a hose.

20. The automatic multi-air bag pneumatic inflation system of claim 12, wherein one or more of the valves in the system control unit and the fill station operate to maintain a predetermined pressure in the air bag.

* * * * *

UNITED STATES PATENT AND TRADEMARK OFFICE
CERTIFICATE OF CORRECTION

PATENT NO. : 10,688,907 B2  
APPLICATION NO. : 15/678353  
DATED : June 23, 2020  
INVENTOR(S) : Freeman et al.

Page 1 of 1

It is certified that error appears in the above-identified patent and that said Letters Patent is hereby corrected as shown below:

In the Specification

In Column 3, Line 3, delete "(0" and insert -- (f) --, therefor.

In Column 10, Line 7, delete "Tillable" and insert -- fillable --, therefor.

In the Claims

In Column 15, Line 59, in Claim 11, delete "bags spaced" and insert -- bags are spaced --, therefor.

In Column 16, Line 33, in Claim 12, delete "bags which" and insert -- bags --, therefor.

Signed and Sealed this  
Eleventh Day of May, 2021

Drew Hirshfeld  
*Performing the Functions and Duties of the  
Under Secretary of Commerce for Intellectual Property and  
Director of the United States Patent and Trademark Office*